June 9, 1931.    J. P. BERTRAM ET AL    1,809,155
DISPLAY CASE
Filed Nov. 22, 1928    2 Sheets-Sheet 1
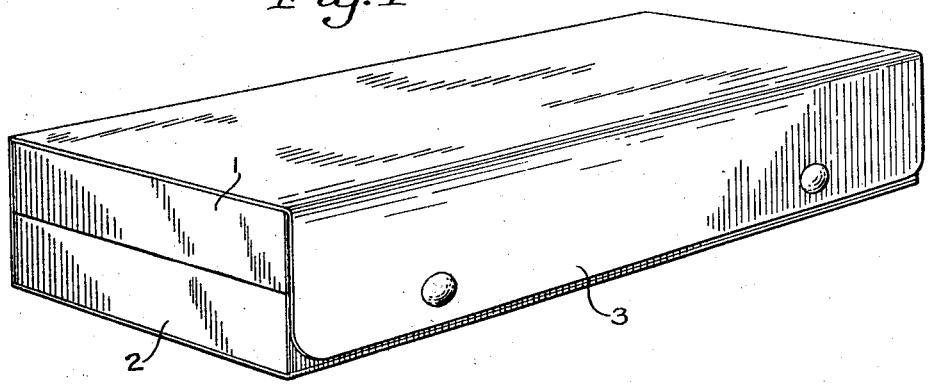
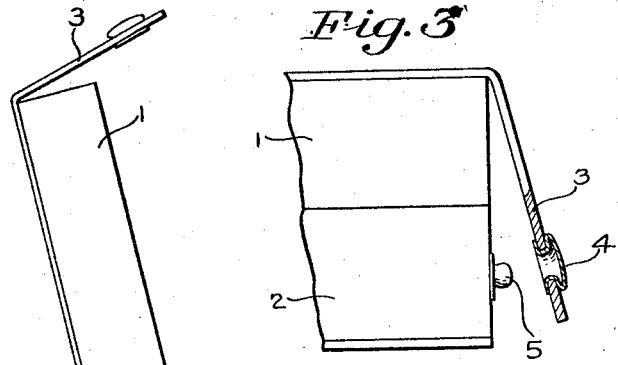
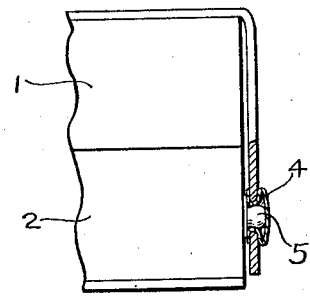
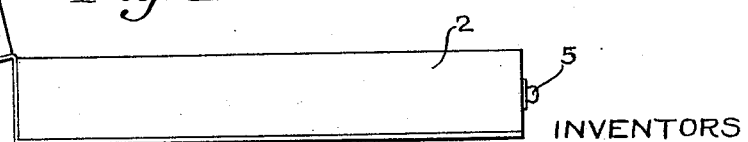
INVENTORS
Jacob P. Bertram
Abraham Berliner
BY
Harold E. Stonebraker
THEIR ATTORNEY June 9, 1931.  J. P. BERTRAM ET AL  1,809,155
DISPLAY CASE
Filed Nov. 22, 1928  2 Sheets-Sheet 2
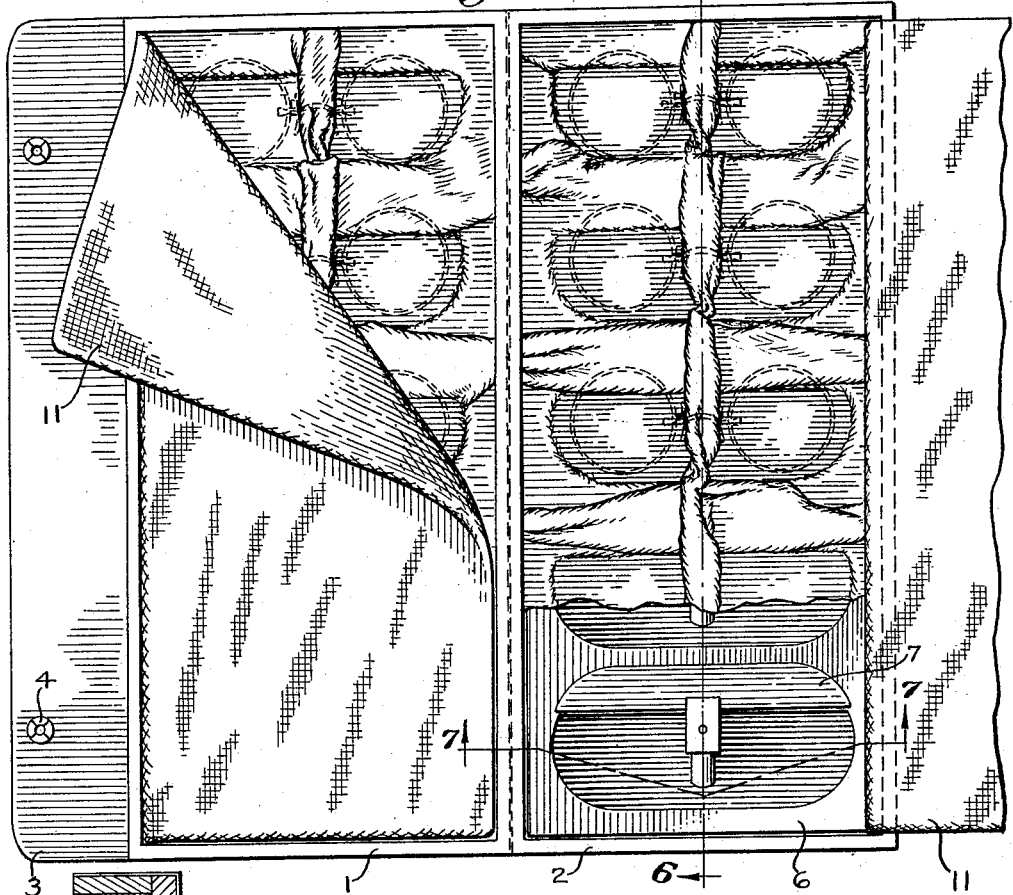
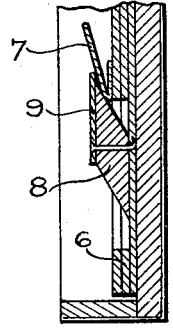 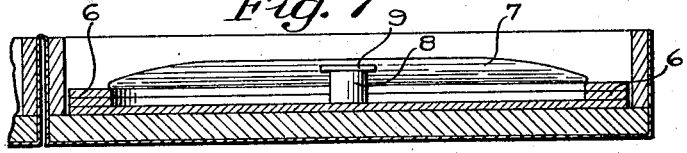
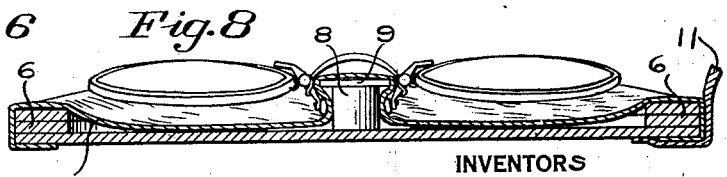
INVENTORS
*Jacob P. Bertram and Abraham Berliner*
BY
Harold E. Stonebraker
THEIR ATTORNEY Patented June 9, 1931

1,809,155

UNITED STATES PATENT OFFICE

JACOB P. BERTRAM AND ABRAHAM BERLINER, OF ROCHESTER, NEW YORK, ASSIGNORS TO SHURON OPTICAL COMPANY, INC., OF GENEVA, NEW YORK, A CORPORATION OF NEW YORK

DISPLAY CASE

Application filed November 22, 1928. Serial No. 321,126.

This invention relates to a display case for eyeglasses, with more particular reference to the type of eyeglass including movable nose guards and finger pieces for operating them, and has for its object to afford a simple and practicable construction that will securely hold such an eyeglass and permit easy positioning or removal thereof.

In a more specific aspect, the invention has for its object to afford a case that will permit displaying the design and all details of an eyeglass in the most effective manner while at the sime time supporting the lenses in a way that prevents likelihood of their breakage.

Another purpose of the improvement is to provide a structure especially adapted to finger piece eyeglasses, with an arrangement that permits quick and easy positioning of an eyeglass and facilitates its removal when desired, while serving to retain the frame securely in the case and to obviate accidental displacement or removal.

With these ends in view, the invention consists in the form and arrangement of parts that will appear clearly from the following description when read in conjunction with the accompanying drawings, the novel features being pointed out in the claim following the description.

In the drawings:

Figure 1 is a perspective view of a display case embodying the invention, and in closed position;

Figure 2 is an end view showing the case partly open;

Figure 3 is an end view with the case closed and the fastening member disengaged;

Figure 4 is a similar view showing the fastening member engaged to hold the hinged sections of the case closed;

Figure 5 is a plan view of the case when fully opened, showing the cover portions thrown back to expose the interior of the case, the position of the eyeglasses appearing in dotted lines;

Figure 6 is a sectional view, partially broken away, on line 6—6 of Figure 5;

Figure 7 is a sectional view on line 7—7 of Figure 5 with the velvet lining removed, and Figure 8 is a sectional view through one of the pockets with the velvet lining in position and an eyeglass frame mounted in the pocket.

In the embodiment of the invention herein illustrated, the display case comprises two sections 1 and 2 which are hinged together in any suitable way, the section 1 having an extension or flap 3 carrying a fastener 4 which engages a cooperating fastening device 5 to hold the sections of the case closed.

Each section 1 and 2 is provided with a series of eyeglass receiving pockets which may be formed in any convenient way as for instance by a series of cardboard units or laminations built up to form the side and end walls of the pocket, as designated at 6. The side wall extending along the upper side of each pocket is provided additionally with a spring-like or yieldable strip 7 which may be of cardboard or other suitable material and affords a yieldable support for the lenses or for the lens frames of an eyeglass.

In order to retain the eyeglasses in the pocket, means is provided at the center of each pocket, preferably adjacent to the upper side wall, such means preferably consisting of a transverse wall or post 8 that has an overhanging top 9 affording a shoulder at each side, as shown in Figures 7 and 8. The entire pocket including the yieldable supporting strip 7 and the center retaining post is covered suitably with a lining of velvet or other desired material, as designated at 10. 11 designate cover portions also of velvet or similar material secured along one edge of the sections 1 and 2 and adapted to protect the eyeglasses in the several compartments when the case is closed. The cover portions 11 are thrown back, as shown in Figure 5, to display the eyeglasses within the case, and to permit their removal.

In positioning an eyeglass of this type, the finger pieces are operated in the same fashion as they are for positioning the eyeglass on the nose of a person, causing the nose guards to be moved away from each other and permitting them to engage around and under the overhanging top 9 of the post 8, as shown in Figure 8. When in this position, the lower edges of the lenses rest at the bottom of the pocket while the upper edges rest upon the yieldable supporting member 7 surmounting the upper side wall of the pocket.

Thus the eyeglass is effectively and completely displayed without anything to obstruct a view of all its parts, and is positioned in the same position as when worn, while the lenses are supported in such a way as to protect them against breakage and the frame is held tightly by the retaining post, so that accidental displacement is effectually prevented.

While the invention has been described with reference to a particular form, it is not confined to the details herein disclosed, and this application is intended to cover such modifications as may come within the intent of the improvements or the scope of the following claim.

We claim:

A display case for finger-piece eyeglasses having a pocket comprising side and end walls, a strip attached to one of the side walls and inclined upwardly away from said wall affording a springlike yieldable support on which the lenses are adapted to rest, a retaining wall arranged transversely of the pocket adjacent to said yieldable support, and an overhanging top portion on said retaining wall adapted to overlie the movable guards of an eyeglass when the latter are brought into yieldable engagement with the sides of said retaining wall and thereby to hold the lenses against said yieldable support.

In witness whereof, we have hereunto signed our names.

JACOB P. BERTRAM.
ABRAHAM BERLINER.